United States Patent
Nestler et al.

(10) Patent No.: US 6,818,792 B2
(45) Date of Patent: Nov. 16, 2004

(54) PREPARATION OF POLYMERIZABLE COMPOUNDS

(75) Inventors: Gerhard Nestler, Vienna (AT); Jürgen Schröder, Ludwigshafen (DE); Nicole McGlone, Boehl-Iggelheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/233,567

(22) Filed: Sep. 4, 2002

(65) Prior Publication Data

US 2003/0060654 A1 Mar. 27, 2003

(30) Foreign Application Priority Data

Sep. 5, 2001 (DE) .......................................... 101 43 565

(51) Int. Cl.⁷ .......................... C07C 67/48; C07C 67/02; C07C 51/42; C07C 233/00; C07C 235/00
(52) U.S. Cl. ........................ 560/218; 560/261; 562/600; 564/216
(58) Field of Search ................................ 560/218, 261; 562/600; 564/216; 585/435

(56) References Cited

U.S. PATENT DOCUMENTS 3,665,041 A * 5/1972 Sianesi et al. .......... 260/615 A
5,883,288 A    3/1999 Iffland et al. ............... 560/205

FOREIGN PATENT DOCUMENTS

| DE | 44 24 779 | * | 1/1996 |
| DE | 44 24 779 A1 | * | 1/1996 |
| DE | 44 25 918 | * | 2/1996 |
| DE | 44 25 918 A1 | * | 2/1996 |
| DE | 196 04 0267 A1 | | 8/1997 |
| EP | 1 057 804 A2 | | 12/2000 |

OTHER PUBLICATIONS

The Merck Index, 13$^{th}$ ed., pp. 1780, 1781 "Vinyl Acetate" Merck & Co., Whitehouse Station NJ © 2001.*

Ullmann's Enclyclopedia of Industrial Chemistry, Chapter: "Acrylic Acid and Derivatices–Esterification", 6th edition, 2000 Electronic Release.

* cited by examiner

Primary Examiner—James O. Wilson
Assistant Examiner—Zachary C. Tucker
(74) Attorney, Agent, or Firm—Oblon, Spivak, McClelland, Maier & Neustadt, P.C.

(57) ABSTRACT

Polymerizable compounds are prepared and/or worked up using at least one liquid ring pump by a process in which a working liquid which contains a material stream from the preparation and/or working-up of the polymerizable compound is used in a liquid ring pump.

7 Claims, No Drawings

PREPARATION OF POLYMERIZABLE COMPOUNDS

The present invention relates to a process for the preparation and/or working-up of polymerizable compounds and an apparatus which is used in this process. In the preparation of polymerizable compounds, e.g. (meth)acrylates, styrene, vinyl acetate, etc., in general at least one process step is carried out under reduced pressure, for example the working-up by distillation or the preparation itself.

Thus, Ullmann's Encyclopedia of Industrial Chemistry, Sixth Edition, 1999, Electronic Release, Section Acrylic Acid and Derivatives—Esterification describes processes for the preparation of higher and lower alkyl acrylates by acid-catalyzed esterification of acrylic acid with the corresponding alcohol in the presence of an acidic catalyst, in which distillation columns in the working-up of the reaction mixture are operated under reduced pressure in order to be able to reduce the distillation temperatures. Such a reduction in the temperature to which polymerizable compounds are exposed is desirable since the danger of polymerization generally increases with increasing temperatures.

In chemical process engineering, liquid ring pumps, in particular water ring pumps, as described, for example, in the above-mentioned Ullmann's Encyclopedia, in the section Vacuum Technology—Liquid and Gas Ring Vacuum Pumps, are widely used for generating a vacuum.

Such pumps have an eccentrically mounted rotor with blades and a working liquid which is present in the casing and forms an annular liquid layer during rotation of the impeller on the inside of the casing.

Because of the blades, this liquid ring forms separate cells which, owing to the eccentricity of the rotor with respect to the axis about which the liquid ring is arranged, have different volumes and thus aspirate a gas volume during rotation of the rotor on the suction side of the pump and convey the gas volume to the outlet side.

Since some working liquid is also discharged on the outlet side, it is generally necessary to compensate the loss by feeding in fresh working liquid.

With the usual use of water as a working liquid, it is possible to generate a vacuum of less than 30 mbar (depending on the water temperature). Since liquid ring pumps can process up to about 5% of their working volume of impurities or liquid drops, they can also be used as condensers.

The disadvantage of pumps of this type is that polymerizable material sucked into the pump can polymerize there and leave behind deposits and is in any case lost to the preparation process since working-up of the discharge is uneconomical owing to the large amounts of water.

EP-A 1 057 804 describes a process for inhibiting polymerization in the vacuum part in the working-up of a readily polymerizable compound by feeding a polymerization inhibitor into the vacuum part.

The disadvantage of the process described there is that no working-up of the polymerizable compound present in the vacuum part is intended and hence the polymerization inhibitor fed in is lost.

It is an object of the present invention to provide a process which reduces the polymerization of polymerizable compounds in liquid ring pumps and reduces the losses of desired product via the liquid ring pump.

We have found that this object is achieved by a process for the preparation and/or working-up of polymerizable compounds using at least one liquid ring pump, in which a working liquid which contains a material stream from the preparation and/or working-up of the polymerizable compound is used in a liquid ring pump.

The novel process can be used in the preparation and/or working-up of polymerizable compounds, for example styrene, vinyl acetate, vinyl propionate, allyl acetic acid, vinylacetic acid, N-vinylformamide, acrylic acid or methacrylic acid (referred to in this document as (meth)acrylic acid) and preferably (meth)acrylates, such as methyl, ethyl, n-butyl and particularly preferably 2-ethylhexyl (meth) acrylate.

Liquid ring pumps which may be used are commercial liquid ring pumps which are known per se to a person skilled in the art and whose working liquid contains a material stream from the preparation and/or working-up of the polymerizable compound.

The working liquid preferably comprises at least 50, particularly preferably at least 75, very particularly preferably 100, % by weight of one or more of said material streams and can, if required, be supplemented by another compound suitable as working liquid, e.g. water.

For example, the pure products, i.e. the polymerizable compounds, in a purity of, as a rule, 95% or more, preferably 98% or more, particularly preferably 99% or more, can be used as the material stream from the preparation and/or working-up, but the starting materials, in a purity of 95% or more, preferably 98% or more, particularly preferably 99% or more, which are used for the preparation of the polymerizable compound, or those material streams which contain the starting materials and/or products and/or intermediates and/or byproducts, may also be used.

This may be, for example, in the case of

Styrene: Benzene or styrene in the above purities or styrene-containing distillation bottom products, Vinyl acetate: Acetic acid or vinyl acetate in the above purities, Vinyl propionate: Propionic acid or vinyl propionate, (Meth)acrylic acid: (Meth)acrylic acid in the above purity, distillation bottom products containing it, streams containing Michael adducts of (meth)acrylic acid, e.g. diacrylic acid, triacrylic acid, etc., high-boiling absorbents, e.g. diphenyl ether, biphenyl, dimethyl, diethyl, di-n-butyl, diisobutyl or di-2-ethylhexyl orthophthalate or mixtures thereof, (Meth)acrylates: (Meth)acrylic acid, starting alcohol, (meth)acrylates in the above purity, distillation bottom products containing them, streams containing Michael adducts of (meth)acrylic acid or its esters, e.g. alkyl alkoxypropionate, alkyl 3-(3'-alkoxypropionyloxy) propionate, etc., solvents which form an azeotropic mixture with water, the (meth)acrylate and/or the alcohol, e.g. cyclohexane, methyl cyclohexane, benzene, toluene, o-, m- or p-xylene or mixtures thereof.

In a preferred embodiment, one or more polymerization inhibitors are mixed with the working liquid.

Examples are alkylphenols, for example o-, m- or p-cresol (methylphenol), 2-tert-butyl-4-methylphenol, 6-tert-butyl-2,4-dimethylphenol, 2,6-di-tert-butyl-4-methylphenol, 2-tert-butylphenol, 4-tert-butylphenol, 2,4-di-tert-butylphenol, 2-methyl-4-tert-butylphenol, 4-tert-butyl-2,6-dimethylphenol or 2,2'-methylenebis(6-tert-butyl-4-methylphenol), 4,4'-oxydiphenyl, 3,4-methylenedioxydiphenol (sesamol), 3,4-dimethylphenol, hydroquinone, pyrocatechol (1,2-dihydroxybenzene), 2-(1'-methylcyclohex-1'-yl)-4,6-dimethylphenol, 2- or 4-(1'-phenyleth-1'-yl)phenol, 2-tert-butyl-6-methylphenol, 2,4,6- tris-tert-butylphenol, 2,6-di-tert-butylphenol, 2,4-di-tert-butylphenol, 4-tert-butylphenol, nonylphenol [11066-49-2], octylphenol [140-66-9], 2,6-dimethylphenol, bisphenol A, bisphenol F, bisphenol B, bisphenol C, bisphenol S, 3,3,5,5'-tetrabromobisphenol A, 2,6-di-tert-butyl-p-cresol, Koresin® from BASF AG, methyl 3,5-di-tert-butyl-4-hydroxybenzoate, 4-tert-butylpyrocatechol, 2-hydroxybenzyl alcohol, 2-methoxy-4-methylphenol, 2,3,6-trimethylphenol, 2,4,5-trimethylphenol, 2,4,6-trimethylphenol, 2-isopropylphenol, 4-isopropylphenol, 6-isopropyl-m-cresol, n-octadecyt-p-(3,5-di-tert-butyl-4-hydroxyphenyl)propionate, 1,1,3-tris(2-methyl-4-hydroxyl-5-tert-butylphenyl)butane, 1,3,5-trimethyl-2,4,6-tis(3,5-di-tert-butyl-4hydroxybenzyl)benzene, 1,3,5-tris(3,5-di-tert-butyl-4-hydroxybenzyl)isocyanurate, 1,3,5-tris(3,5-di-tert-butyl-4-hydroxyphenyl)propionyloxyethyl isocyanurate, 1,3,5-tris(2,6-dimethyl-3-hydroxy-4-tert-butylbenzyl) isocyanurate or pentaerythrityl tetrakis[β-(3,5-di-tert-butyl-4-hydroxyphenyl)propionate], 2,6-di-tert-butyl-4-dimethylaminomethylphenol, 6-sec-butyl-2,4-dinitrophenol, Irganox® 565, 1141, 1192, 1222and 1425 from Ciba Spezialitatenchemie, octadecyl 3-(3',5'-di-tert-butyl-4'-hydroxyphenyl)propionate, hexadecyl 3-(3',5'-di-tert-butyl-4'-hydroxyphenyl)propionate, octyl 3-(3',5'-di-tert-butyl-4'-hydroxyphenyl)propionate, 3-thia-1,5-pentanediol bis[(3',5'-tert-butyl-4'-hydroxyphenyl) propionate], 4,8-dioxa-1,11-undecanediol bis[(3',5'-di-tert-butyl-4'-hydroxyphenyl)propionate], 4,8-dioxa-1,11-undecanediol bis[(3'-tert-butyl-4'-hydroxy-5'-methylphenyl) propionate], 1,9-nonanediol bis[(3',5'-di-tert-butyl-4'-hydroxyphenyl)propionate], 1,7-heptanediaminebis[3-(3',5'-di-tert-butyl-4'-hydroxyphenyl)propionamide], 1,1-methanediaminebis[3-(3',5'-di-tert-butyl-4'-hydroxyphenyl) propionamide], 3-(3',5'-di-tert-butyl-4'-hydroxyphenyl) propionic acid hydrazide, 3-(3',5'-dimethyl-4'-hydroxyphenyl)propionic acid hydrazide, bis(3-tert-butyl-5-ethyl-2-hydroxyphen-1-yl)methane, bis(3,5-di-tert-butyl-4-hydroxyphen-1-yl)methane, bis[3-(1'-methylcyctohex-1'-yl)-5-methyl-2-hydroxyphen-1-yl]-methane, bis(3-tert-butyl-2-hydroxy-5-methylphen-1-yl)methane, 1,1-bis(5-tert-butyl-4-hydroxy-2-methylphen-1-yl)ethane, bis(5-tert-butyl-4-hydroxy-2-methylphen-1-yl)sulfide, bis(3-tert-butyl-2-hydroxy-5-methylphen-1-yl)sulfide, 1,1-bis(3,4-dimethyl-2-hydroxyphen-1-yl)-2-methylpropane, 1,1-bis(5-tert-butyl-3-methyl-2-hydroxyphen-1-yl)butane, 1,3,5-tris [1'-(3",5"-di-tert-butyl-4"-hydroxyphen-1"'-yl)meth-1'-yl]-2,4,6-trimethylbenzene, 1,1,4-tris(5'-tert-butyl-4'-hydroxy-2'-methylphen-1'-yl)butane, aminophenols, e.g. para-aminophenol, nitrosophenols, e.g. para-nitrosophenol or p-nitroso-o-cresol, alkbxyphenols, for example 2-methoxyphenol (guajacol, pyrocatechol monomethyl ether), 2-ethoxyphenol, 2-isopropoxyphenol, 4-methoxyphenol (hydroquinone monomethyl ether), mono- or di-tert-butyl-4-methoxyphenol, 3,5-di-tert-butyl-4-hydroxyanisole, 3-hydroxy-4-methoxybenzyl alcohol, 2,5-dimethoxy-4-hydroxybenzyl alcohol (syringa alcohol), 4-hydroxy-3-methoxybenzaldehyde (vanillin), 4-hydroxy-3-ethoxybenzaldehyde (ethylvanillin), 3-hydroxy-4-methoxybenzaldehyde (isovanillin), 1-(4-hydroxy-3-methoxyphenyl)ethanone (acetovanillone), eugenol, dihydroeugenol or isoeugenol, tocopherols, e.g. α-, β-, γ-, δ- and ε-tocopherol, tocol, α-tocopherolhydroquinone, and 2,3-dihydro-2,2-dimethyl-7-hydroxybenzofuran (2,2-dimethyl-7-hydroxycoumarane), quinones and hydroquinones, such as hydroquinone or hydroquinone monomethyl ether, 2,5-di-tert-butyl hydroquinone, 2-methyl-p-hydroquinone, 2,3-dimethylhydroquinone, trimethylhydroquinonc, 4-methylpyrocatechol, tert-butylhydroquinone, 3-methylpyrocatechol, benzoquinone, 2-methyl-p-hydroquinone, 2,3-dimethylhydroquinone, trimethylhydroquinonc, 3-methylpyrocatechol, 4-methylpyrocatechol, tert-butylhydroquinone, 4-ethoxyphenol, 4-butoxyphenol, hydroquinone monobenzyl ether, p-phenoxyphenol, 2-methylhydroquinone, 2,5-di-tert-butylhydroquinone, tetranethyl-p-benzoquinone, diethyl-1,4-cyclohexanedione-2,5-dicarboxylate, phenyl-p-benzoquinone, 2,5-dimethyl-3-benzyl-p-benzoquinone, 2-isopropyl-5-methyl-p-benzoquinone (thymoquinone), 2,6-diisopropyl-p-benzoquinone, 2,5-dimethyl-3-hydroxy-p-benzoquinone, 2,5-dihydroxy-p-benzoquinone, embelin, tetrahydroxy-p-benzoquinone, 2,5-dimethoxy-1,4-benzoquinone, 2-amino-5-methyl-p-benzoquinone, 2,5-bisphenylamino-1,4-benzoquinone, 5,8-dihydroxy-1,4-naphthoquinone, 2-anilino-1,4-naphthoquinone, anthraquinone, N,N-dimethylindoaniline, N,N-diphenyl-p-benzoquinonediimine, 1,4-benzoquinonedioxime, coerulignone, 3,3'-di-tert-butyl-5,5'-dimethyldiphenoquinone, p-rosolic acid (aurin), 2,6-di-tert-butyl-4-benzylidenebenzoquinone, 2,5-di-tert-amylhydroquinone, N-oxyls, such as 4-hydroxy-2,2,6,6-tetramethylpiperidin-N-oxyl, 4-oxo-2,2,6,6-tetramethylpiperidin-N-oxyl, 4-acetoxy-2,2,6,6-tetramethylpiperidin-N-oxyl, 2,2,6,6-tetramethylpiperidin-N-oxyl, 4,4',4"-tris(2,2,6,6-tetramethylpiperidin-N-oxyl) phosphite, 3-oxo-2,2,5,5-tetramethylpyrrolidin-N-oxyl, 1-oxyl-2,2,6,6-tetramethyl-4-methoxypiperidine, 1-oxyl-2,2,6,6-tetramethyl-4-trimethylsilyloxypiperidine, 1-oxyl-2,2,6,6-tetramethylpiperidin-4-yl-2-ethylhexanoate, 1-oxyl-2,2,6,6-tetramethylpiperidin-4-yl-stearate, 1-oxyl-2,2,6,6-tetramethylpiperidin-4-yl-benzoate, 1-oxyl-2,2,6,6-tetramethylpiperidin-4-yl-(4-tert-butyl)benzoate, bis(1-oxyl-2,2,6,6-tctramethylpiperidin-4-yl)succinate, bis(1-oxyl-2,2,6,6-tetramethylpiperidin-4-yl)adipate, bis(1-oxyl-2,2,6,6-tetramethylpiperidin-4-yl) 1,10-decanedioate, bis(1-oxyl-2,2,6,6-tetramethylpiperidin-4-yl)n-butylmalonate, bis (1-oxyl-2,2,6,6-tetramethylpiperidin-4-yl)phthalate, bis(1-oxyl-2,2,6,6-tetramethylpiperidin-4-yl)isophthalate, bis(1-oxyl-2,2,6,6-tetramethylpiperidin-4-yl)terephthalate, bis(1-oxyl-2,2,6,6-tetramethylpiperidin-4-yl) hexahydroterephthalate, N,N'-bis(1-oxyl-2,2,6,6-tetramethylpiperidin-4-yl)adipamide, N-(1-oxyl-2,2,6,6-tetramethylpiperidin-4-yl)caprolactam, N-(1-oxyl-2,2,6,6-tetramethylpiperidin-4-yl)dodecylsuccinimide, 2,4,6-tris[N-butyl-N-(1-oxyl-2,2,6,6-tetramethylpiperidin-4-yl]-triazine, N,N'-bis( 1-oxyl-2,2,6,6-tetramethylpiperidin-4-yl)-N,N'-bisformyl-1,6-diaminohexane, 4,4'-ethylenebis(1-oxyl-2,2,6,6-tetramethylpiperazin-3-one), aromatic amines or phenylenediamines, such as N,N-diphenylamine, N-nitrosodiphenylamiine, nitrosodiethylaniline, N,N'-dialkyl-para-phenylendiamine, where the alkyl radicals may be identical or different and in each case, independently of one another, are of 1 to 4 carbon atoms and may be straight-chain or branched, for example N,N'-diisobutyl-p-phenylendiamine, N,N'-diisopropyl-p-phenylendiamine, frganox 5057 from Ciba Spezialitaitenchemie, p-phenylenediaminc, N-phenyl-p-phenylenediaamine, N,N'-diphenyl-p-phenylenediamine, N-isopropyl-N-phenyl-p-phenylenediamine, N,N'-di-sec-butyl-p-phenylenediamine (Kerobit® BPD from BASF AG), N-phenyl-N'-isopropyl-p-phenylenediamine (Vulkanox® 4010 from Bayer AG), N-(1,3-dimethylbutyl)-N'-phenyl-p-phenylenediamine, N-phenyl-2-naphthylamine, iminodibenzyl, N,N'-diphenylbenzidine, N-phenyltetraaniline, acridone, 3-bydroxydiphenylamine, 4-hydroxydiphenylamine, hydroxylamines, such as N,N-diethylhydroxylamine, urea derivatives, such as urea or thiourea, phosphorus-containing compounds, such as triphenylphosphine, triphenyl phosphite, hypophosphorous acid or triethyl phosphite, or sulfur-containing compounds, such as diphenyl sulfide or phenothiazine.

They may be used, if required, as a mixture with metal salts, for example copper, manganese, cerium, nickel or chromium salts as chloride, dithiocarbamate, sulfate, salicylate or acetate.

4-Hydroxy-2,2,6,6-tetramethylpiperidin-N-oxyl, hydroquinone monomethyl ether or phenothiazine is preferably used.

The polymerization inhibitors are each usually used in amounts of from 10–2000 ppm, preferably 20–1000 ppm, particularly preferably 50–500 ppm.

It is of course also possible to use larger amounts of polymerization inhibitors, which are limited only by the solubility of the inhibitor in the solvent, for example 0.2–5, preferably 0.3–3, particularly preferably 0.5–2, % by weight.

In a particularly preferred embodiment, the stabilizer batches are used as working liquid, i.e. a solution of at least one polymerization inhibitor in one of said material streams, preferably in a starting material or product, which are prepared for metering the polymerization inhibitor into the preparation or working-up process.

In general, those material streams which have a flashpoint of 55° C. or higher, particularly preferably 65° C. or higher, are preferably used as working liquids. This is advisable for safety reasons, if leaks should occur in a liquid ring pump, in order, for example, to avoid fires.

The novel process is preferably used in the preparation and/or working-up of (meth)acrylic acid or (meth)acrylates, particularly preferably in the case of (meth)acrylates.

Among said (meth)acrylates, the n-butyl and 2-ethylhexyl esters are preferred, 2-ethylhexyl acrylate being particularly preferred.

In the latter case, 2-ethythexanol (starting material), 2-ethythexyl acrylate (product) or a stabilizer batch in the starting material or product, particularly preferably the starting material, or a stabilizer batch in the starting material, is preferably used as working liquid in a liquid ring pump.

According to the invention, it is important that the spent working liquid can be recycled to the preparation and/or to the working-up of the polymerizable compound. Any desired products which have condensed out or have been introduced in another manner in the working liquid can be recovered in this way.

In order to keep the concentration of polymerizable compounds as low as possible when using a nonpolymerizable compound, for example a starting material, as working liquid, it is advantageous to exchange the working liquid continuously or batchwise and pass it into the preparation and/or working-up.

The present invention furthermore relates to a liquid ring pump which operates with one of the abovementioned streams as working liquid.

This is a liquid ring pump comprising a casing with gas inlet and outlet and inlet for the working liquid, and comprising a symmetrical, rotatable rotor which is provided with blades and is centered along an axis (rotor axis) which is displaced parallel to the axis about which the working liquid present in the casing is arranged on rotation of the rotor (liquid axis); the gas inlet is present on that side of the rotor axis which faces the liquid axis and the gas outlet is present on that side of the rotor axis which faces away from the liquid axis, the working liquid being one of the abovementioned streams.

A preferred liquid ring pump is one which operates with n-butanol, n-butyl acrylate, 2-ethythexanol, 2-ethylhexyl acryl ate, biphenyl/diphenyl ether mixtures or biphenyl/diphenyl ether/phthalate mixtures as working liquid, with which, if required, at least one of the abovementioned polymerization inhibitors may also advantageously be mixed.

The working liquid discharged from the liquid ring pump is advantageously fed to the preparation and/or the working-up of the respective process.

In general, the discharged working liquid is preferably fed in at those points of the preparation and/or working-up process at which the main component and the impurities contained in the discharged working liquid occur in the most similar concentration.

If the working liquid used is a starting material, it is advantageously fed into the preparation process or into a working-up process in which this starting material is separated from other compounds, for example by distillation.

If it is a product, the discharged working liquid is preferably fed to a working-up process in which the product is purified, for example by distillation.

If the working-up liquid used is a stabilizer batch, the discharged working liquid is preferably fed in at the point at which the stabilizer batch would be fed in if it were not used as working liquid.

The novel process is illustrated below, by way of example, for the preparation of 2-ethylhexyl acrylate, as described in DE-A 196 04 267, and there in particular in FIG. 2, but is by no means limited thereto:

The esterification takes place in a reaction zone in a homogeneous, liquid phase at elevated temperatures by reaction of acrylic acid with 2-ethylhexyl alcohol in a molar ratio of 1:0.75 to 1:2, preferably from 1:0.9 to 1:1.1, particularly preferably from 1:1. (Meth)acrylic acid, alcohol and acid catalyst are fed to the reaction zone and the water formed is separated off by rectification during a residence time as part of a mixture comprising starting alcohol, via the top of a rectification unit III attached to the reaction zone. The resulting distillate is separated into an organic phase containing starting alcohol and into a water-containing aqueous phase. The organic phase can be recycled as reflux into the rectification unit III. The reaction mixture thus substantially freed from water is discharged from the reaction zone and fed to a separation zone. Alternatively, the esterification can be carried out in the presence of a solvent which forms an azeotropic mixture with water and/or with the alcohol, in order to be able to separate off the water of reaction more easily. For example, cyclohexane, methylcyclohexane, benzene, toluene, o-, m- or p-xylene is suitable, and octene mixtures formed by secondary reactions of the 2-ethythexyl alcohol used and containing, for example, 2-ethylhex-1-ene, 3-methylhept-2-ene, 3-methylhept-3-ene and other isomers are particularly suitable.

The reaction zone consists of one or more reaction regions. In one embodiment comprising a plurality of reaction regions, it may be advantageous to arrange these in a cascade. The liquid discharge stream of one reaction region forms the feed of the downstream reaction region. This can preferably be effected with the aid of an overflow. Where the individual reaction regions are apparatuses separated from one another, the number thereof is as a rule at least 2 and up to 4, taking into account the capital costs. If more than one reaction region is provided within one and the same reactor (for example by the use of sheet metal partitions), the number of reaction regions may also be greater than 4. In the case of a plurality of reaction regions, the vapors of the reaction regions are preferably fed to a common rectification column whose liquid discharge advantageously enters the first reaction region.

The reaction temperature is as a rule 70–150° C., preferably 80–130° C., in the first reaction region and 100–160° C., preferably 110–130° C., in the last region. The reaction temperature is preferably established so that it increases along the cascade.

The pressure in the reaction regions is preferably generated by at least one novel liquid ring pump and is from 100 mbar to atmospheric pressure, preferably 200–700 mbar. Advantageously, the pressure is the same in all reaction regions.

The total residence time of the reactants in the reaction region is 0.5–10 h, preferably 1–7 h, particularly preferably 2–5h.

A preferably used acidic esterification catalyst is para-toluenesulfonic acid. Its content in the reaction zone is 0.1–10, preferably 0.1–6, % by weight, based on the reaction mixture contained therein. Other acidic esterification catalysts, such as sulfonic acid and/or organic sulfonic acids, such as methanesulfonic acid, benzenesulfonic acid or dodecylbenzenesulfonic acid, may also be used.

As a rule, both the acrylic acid and the acidic esterification catalysts are fed directly to the reaction zone. The starting alcohol to be esterified is preferably fed to the reaction zone via the rectification unit III attached to said zone. This rectification unit III may consist of a rectification column of known design, for example having bubble trays or sieve trays. The reaction regions may advantageously consist of reactors having stirrers or natural-circulation or forced-circulation evaporators.

The term rectification unit is to be understood in this document as a general designation for apparatuses in which vapors which ascend and are in contact with downflowing liquid phase are produced by supplylng heat. Simple distillation columns are also included here. As a rule, however, these arc rectification columns which contain internals for thorough contact between liquid and vapor. Such internals are trays, such as bubble trays, perforated trays, in particular dual-flow trays, dumped packings, stacked packings or the like. To make it easier to understand the relationships, the various rectification units are denoted by Roman numerals. The various products described individually also have such a designation, which is based on the designation in DE-A 196 04 267. The rectification units are each equipped with force-circulation or natural-circulation evaporators and condensers of conventional design in each case.

The product mixture discharged from the reaction zone is fed to the rectification unit I. A part of the aqueous phase obtained at the top of the rectification unit III can be recycled to the rectification unit III and the remainder can, for example, be discharged.

The product mixture fed to the rectification unit I is separated therein into a product VII containing the 2-ethylhexyl ester of acrylic acid, the remaining 2-ethylhexanol and remaining acrylic acid and into a product VIII containing the acidic esterification catalyst and components having a higher boiling point than that of the 2-ethylhexyl ester of acrylic acid. A rectification column is expediently used as rectification unit I, preferably one having 5–20 trays, particularly preferably a column having 8–12 trays, preferably dual-flow trays. The bottom temperature is as a rule from 120 to 160° C., preferably from 130 to 150° C., and the top pressure from 20 to 100, preferably from 40 to 70, mbar. The product mixture discharged from the reaction zone is fed to this column, preferably in the lower part.

The product VIII is obtained from the bottom of this rectification column and the product VII from the top thereof A part of the product VIII is expediently recycled into the reaction zone, preferably into the first reaction region, either directly and/or via the rectification unit III. Advantageously, a part of the product VIII is discharged and fed to distillation unit IV and separated therein into a product IX containing 2-ethylhexanol, acrylic acid and the 2-ethylhexyl ester of acrylic acid and a product X containing the acidic esterification catalyst and components having a boiling point higher than that of the 2-ethylhexyl ester of acrylic acid.

The product IX can then be recycled to the rectification unit I and/or to the reaction zone.

Some or all of the esterification catalysts can be separated from the product VIII and/or the product X by extraction with water, and some or all of the resulting aqueous phase can be recycled to the reaction zone. For example, some of the aqueous phase obtained in the phase separator of the rectification unit III can be used for this extraction.

The product VII removed from the rectification unit I can be fed to the rectification unit II and separated therein into a) a product XI which contains the remaining 2-ethylhexanol, acrylic acid and components having a lower boiling point than that of 2-ethylhexyl acrylate, b) the desired ester of 2-ethylhexyl acrylate (pure product) and c) a product XII which comprises components having a boiling point higher than that of 2-ethylhexyl acrylate.

The product XI can be recycled to the reaction zone, preferably via the second reaction region, and the product XII can be recycled into the rectification unit I, for example into the bottom of the column or as reflux, or it can be used as solvent for the stabilizer batches.

The rectification unit II is expediently in the form of a rectification column, for example having from 10 to 40, preferably from 20 to 30, trays, preferably dual-flow trays. The bottom temperature is, for example, from 110 to 140° C., preferably from 120 to 130° C., and the top pressure is from 10 to 50, preferably from 20 to 30, mbar.

Here, the product XI can be taken off in the upper part, the product XII in the bottom and the 2-ethylhexyl acrylate as a side take-off in vapor form in the lower part. On condensation, the side take-off in vapor form can be mixed with a suitable storage stabilizer; preferably, this is sprayed as a solution in the pure product into the condenser.

The rectification units I, II and III are preferably stabilized by means of at least one of the abovementioned stabilizers in the form of a stabilizer batch; preferably, a solution of at least one stabilizer in 2-ethylhexyl acrylate or 2-ethylhexyl alcohol is used.

The rectification units I, II, III and IV and, if required, the reaction regions are connected via their condensers to at least one vacuum unit, preferably to, in each case, a vacuum unit which consists of at least one novel liquid ring pump.

If 2-ethylhexyl alcohol (starting material) is used as working liquid in said pump, the spent working liquid can be fed as fresh feed to the reaction zone. The addition of the spent working liquid as reflux to the rectification unit III is preferred.

It is also possible, but less preferable compared with the above two feeds, to feed the spent working liquid into the rectification unit I, in particular as a reflux of the column.

If 2-ethylhexyl acrylate (product) is used as working liquid, the spent working liquid can be passed, for example, into the top of the rectification unit I or into the rectification unit II, preferably as a reflux to the top of the column.

If a stabilizer batch, for example 4-hydroxy-2,2,6,6-tetramethylpiperidin-1-oxyl, phenothiazine or hydroquinone monomethyl ether in 2-ethylhexyl alcohol or 2-ethylhexyl acrylate, is used as working liquid, the spent working liquid is introduced, preferably sprayed, into the top of the rectification unit I or into the associated condenser in the case of 2-ethylhexyl alcohol as solvent or is introduced, preferably sprayed, into the top of the rectification unit II or into the associated condenser in the case of 2-ethylhexyl acrylate as solvent.

It is of course also possible to use one of said material streams, for example VII, VIII, IX, X, XI or XII, among these preferably VIII, IX, X, XI or XII, as working liquid. The respective spent working liquids are then preferably fed back into the process at the respective removal point or shortly behind said point in the direction of flow. It may be advantageous to use a stream containing high boilers, e.g. IX, X or XII, at least partly as working liquid since this then has a relatively low vapor pressure and a better vacuum can thus be generated.

In this case, the spent working liquid is fed in again, as described above, at or behind the removal point or is passed into the rectification unit IV.

Of course, mixtures of said material streams may also be used as working liquids.

An advantage of the present invention is that product taken off via the vacuum unit can be easily recycled to the process, that no polymer which could coat the pumps is obtained and that the liquid ring pumps produce no wastewater which, owing to its content of foreign components, would have to be treated.

The working liquid used in the liquid ring pumps is advantageously cooled to a low temperature, for example from 10 to 60° C., preferably 10–50° C., particularly preferably from to 40° C., before it is used.

The amount of working liquid exchanged is as a rule from 1 to 4 m$^3$/h in the case of liquid ring pumps of an industrially customary size.

For example, in each case from 5 to 100%, preferably from 10 to 100%, particularly preferably from 50 to 100%, very particularly preferably 100%, of the starting materials or stabilizer batches used can be employed as working liquid before they are fed to the process.

From 5 to 50%, preferably from 10 to 40%, particularly preferably from 20 to 30%, of the resulting product or other streams can be used as working liquid before they are fed to the process.

The content of components contained in the working liquid and originating from the process is dependent on the vapor pressures of the respective components, the effectiveness of the condensers connected between rectification unit and vacuum unit and the temperature and the reduced pressure generated.

Usually, the total content of components in the discharged working liquid which originate from the process is not more than 20, preferably not more than 15, particularly preferably from 0.1 to 10, % by weight.

The content can of course be reduced or increased by increasing or reducing the amount exchanged.

The reduced pressure obtainable using the liquid ring pumps described is dependent on the working liquid used and the temperature thereof.

At best, it is usually the vapor pressure of the working liquid used at the respective temperature, in general from 10 to 100%, preferably from 20 to 50%, higher.

When 2-ethylhexyl alcohol is used as working liquid, as a rule a reduced pressure of from 10 mbar to atmospheric pressure, for example from 10 to 800, preferably from 20 to 600, particularly preferably from 30 to 500, mbar can be generated.

The vacuum unit can generate the reduced pressure either for the whole preparation and/or working-up process or for a plurality of regions which operate at similar pressure or for each individual region, for example for each distillation unit or each reaction zone individually.

In the last-mentioned case, the liquid ring pumps can be operated with different working liquids, the statements made above being applicable for each individual one.

It is of course also possible to connect a plurality of liquid ring pumps in series, for example from 2 to 4, preferably 2 or 3, in order thus to generate reduced pressure in a plurality of pressure stages.

It is of course also possible to carry out the novel process in the case of nonpolymerizable compounds in order to recover compounds drawn into the liquid ring pumps.

In this document, parts, percentages and ppm are by weight, unless stated otherwise.

EXAMPLE

In a production plant for the preparation of 2-ethylhexyl acrylate, as described in DE 196 04 267, 7 600 kg of 2-ethylhexyl acrylate were prepared per hour. The vacuum pumps used were liquid ring pumps. The working liquid was 2-ethylhexanol (starting material). The working liquid was exchanged continuously.

|  | Amount exchanged | Content of 2-ethylhexyl acrylate therein | Content of acrylic acid therein |
| --- | --- | --- | --- |
| Column III | 1050 kg/h | 2 kg/h (0.2%) | 2 kg/h (0.2%) |
| Column I | 2480 kg/h | 79 kg/h (3.2%) | 17 kg/h (0.7%) |
| Column II | 3320 kg/h | 90 kg/h (2.7%) | 60 kg/h (1.8%) |
| Total | 6850 kg/h | 171 kg/h | 79 kg/h |

The exchanged working liquid was used as feed for the esterification and fed in via column III. Altogether, 171 kg/h of 2-ehtylhexyl acrylate and 79 kg/h of acrylic acid were recovered, which, in the case of water as working liquid (water ring pump), would have been lost. The liquid ring pumps were operated for months without polymer forming in the pumps. No wastewater was produced.

We claim:

1. A process for the preparation and/or working-up of polymerizable compounds using at least one liquid ring pump, wherein a working liquid which contains a material stream from the preparation and/or working-up of the polymerizable compound is used in a liquid ring pump, wherein the working liquid used is a starting material of the preparation of the polymerizable compound.

2. A process as claimed in claim 1, wherein the working liquid discharged from the liquid ring pump is fed into the preparation and/or working-up of the polymerizable compound.

3. A process as claimed in claim 1, wherein the working liquid contains at least one polymerization inhibitor.

4. A process as claimed in claim 1, wherein the polymerizable compound is styrene, vinyl acetate, vinyl propionate, allyl acetic acid, vinyl acetic acid, N-vinylformamide, acrylic acid or methacrylic acid.

5. A process as claimed in claim 1, wherein the polymerizable compound is a (meth)acrylate.

6. A process as claimed in claim 5, wherein the (meth) acrylate or is n-butyl acrylate or 2-ethylhexyl acrylate.

7. A process for the preparation and/or working-up of polymerizable compounds using at least one liquid ring pump, wherein a working liquid which contains a material stream from the preparation and/or working-up of the polymerizable compound is used in a liquid ring pump, wherein the polymerizable compound is 2-ethylhexyl acrylate and 2-ethylhexanol is used as the working liquid.

* * * * *